H. W. BROWN.
HEADLIGHT FOR AUTOMOBILES AND OTHER VEHICLES.
APPLICATION FILED SEPT. 26, 1917.
1,295,424.
Patented Feb. 25, 1919.
2 SHEETS—SHEET 1.
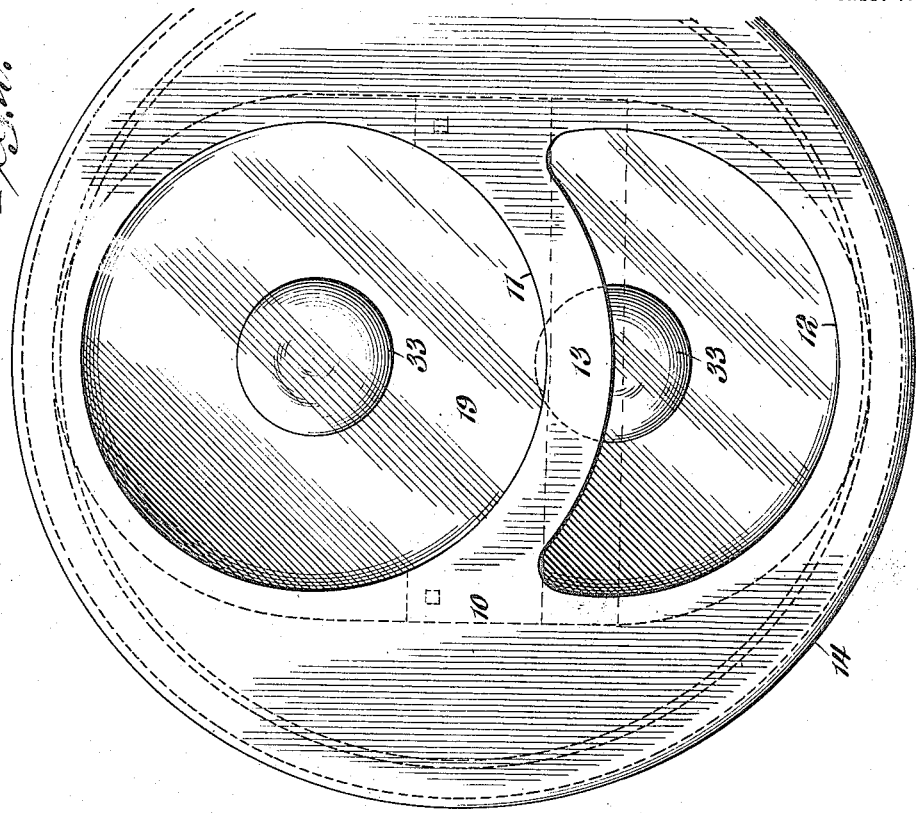
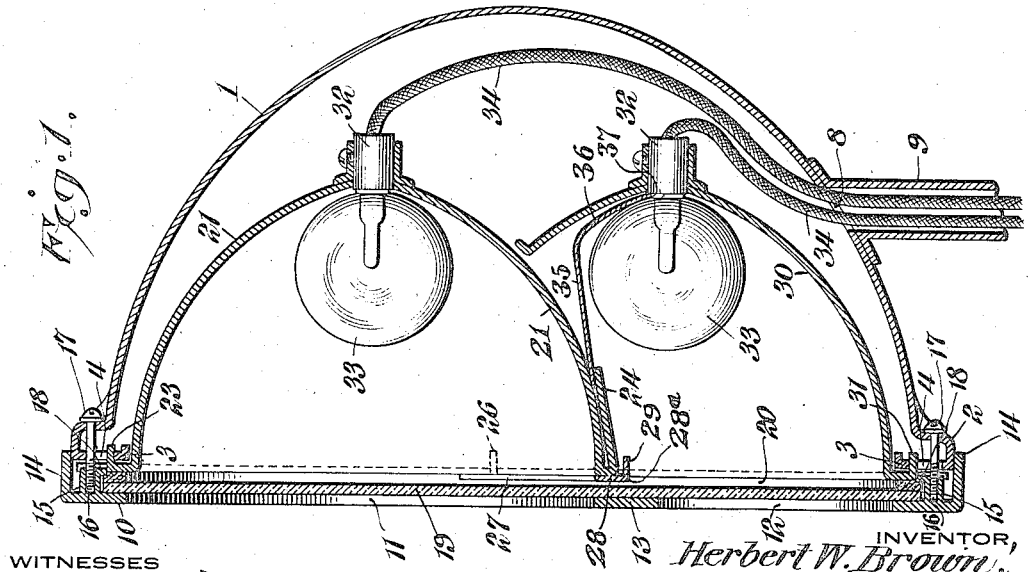
WITNESSES
Howard D. Orr
F. T. Chapman
INVENTOR,
Herbert W. Brown,
BY
ATTORNEY

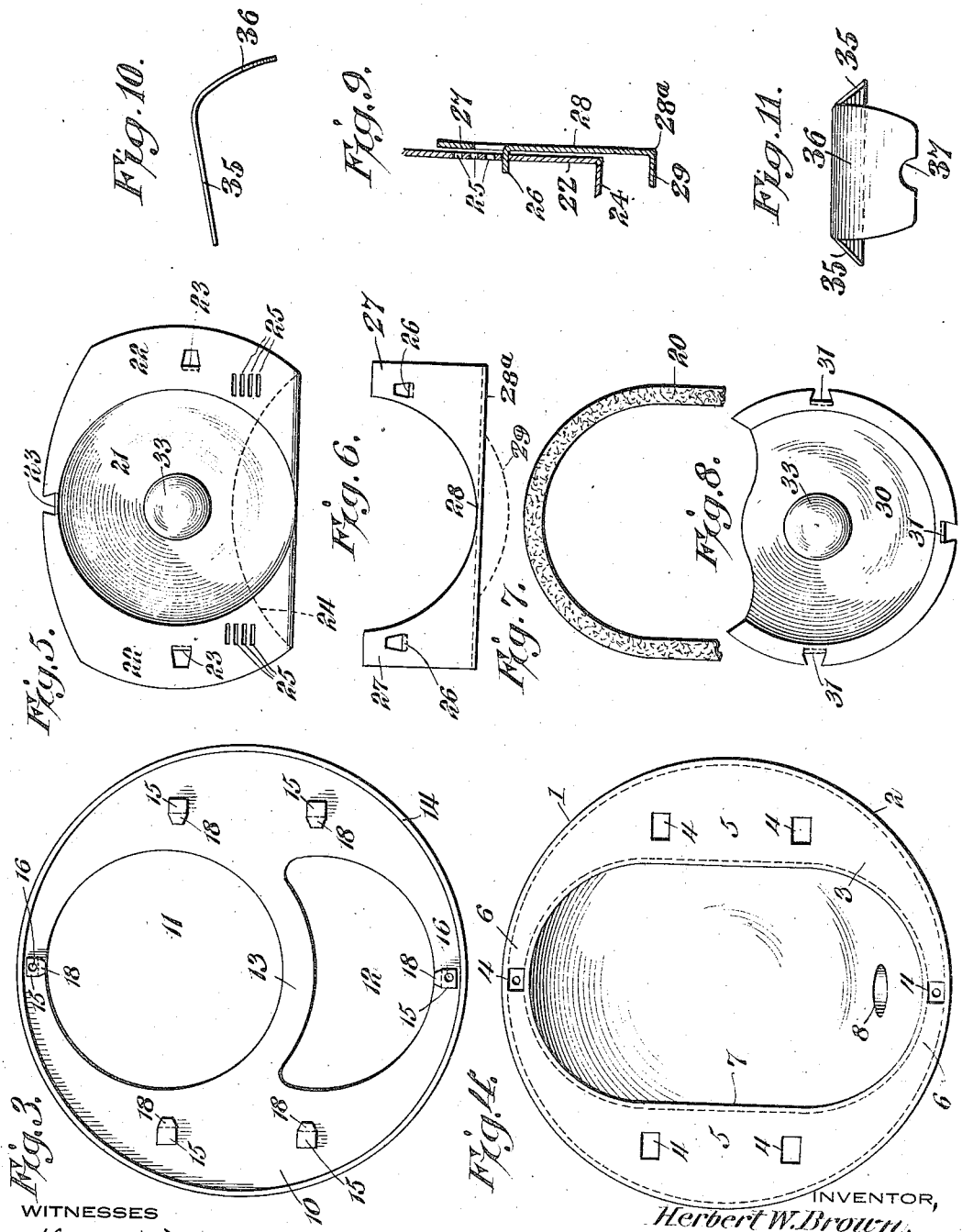

UNITED STATES PATENT OFFICE.

HERBERT W. BROWN, OF ASHLAND, OHIO.

HEADLIGHT FOR AUTOMOBILES AND OTHER VEHICLES.

1,295,424.    Specification of Letters Patent.    Patented Feb. 25, 1919.

Application filed September 26, 1917. Serial No. 193,333.

*To all whom it may concern:*

Be it known that I, HERBERT W. BROWN, a citizen of the United States, residing at Ashland, in the county of Ashland and State of Ohio, have invented a new and useful Headlight for Automobiles and other Vehicles, of which the following is a specification.

This invention has reference to headlights for automobiles and other vehicles, and its object is to provide a headlight capable of giving partial or full illumination and of illuminating the roadway well in advance of the vehicle with the beam of light sufficiently low to prevent intense glare from reaching the eyes of an approaching person or of a person toward which the vehicle is moving.

In accordance with the invention, there is provided a suitable casing which in general appearance may be similar to the casings of ordinary automobile headlights, and the casing is furnished with a glass front as is customary. The glass is held in the casing by a suitable ring fastened to the casing. The invention differs from ordinary headlights in that reflectors are provided preferably each of less area than the front of the casing and one of the reflectors is so arranged and related to the other reflector as to produce a crescent, or, in some instances, a semi-circular appearance, with the horns of the crescent uppermost. The other reflector may define a full circle and is usually located above the crescent shaped reflector or light emitting portion of the headlight.

The invention also has to do with various structural features which will hereinafter more fully appear.

The invention will be best understood from a consideration of the following detailed description, taken in connection with the accompanying drawings forming part of this specification, with the further understanding that, while the drawings show a practical form of the invention, the latter is not confined to any strict conformity with the showing of the drawings but may be changed and modified so long as such changes and modifications come within the scope of the appended claims.

In the drawings:

Figure 1 is a diametric vertical section of a headlight embodying the invention;

Fig. 2 is a face view of the structure shown in Fig. 1;

Figs. 3 to 8 are views of different parts entering into the structure;

Fig. 9 is a detail section through the junction portion of the upper reflector and the light shield applied thereto;

Figs. 10 and 11 are edge and rear views respectively, of a reflecting plate for the lower reflector.

Referring to the drawings, there is shown a casing 1 of approximately hemispherical shape, although it may have more of the oval shape as is customary in headlights, if such particular shape is desirable.

The front edge of the casing is formed into a circumferential bead 2 with an inwardly directed diametric flange 3 having perforations or passages 4 at intervals.

The flange 3 in the particular showing of the drawings and as best appears in Fig. 4 is not of equal width throughout its circumferential length, but preferably has wider side portions 5 than top and bottom portions 6. The casing 1 has a front opening 7 defined by the flange 3 and because the flange is preferably wider at the sides than the top and bottom, the opening 7 is elliptical. The passages 4 are arranged in more or less close relation to the opening 7 and consequently, the openings 4 are preferably in an elliptical series instead of in a circular series as they would be if equi-distant from the margins of the casing.

At a suitable point the casing has an opening 8 therethrough, and this opening is surrounded by a tube 9 which may act simply as a conduit or may be sturdy enough to serve as a support for the headlight.

Applied to but spaced from the front of the casing is a face plate 10 which may have a shape similar to that of the front of the casing except that instead of an elliptical opening like the opening 7, the face plate 10 has two openings 11 and 12 respectively, divided by a connecting plate or web 13. The opening 11 is shown as round with the connecting plate 13 conforming to the round contour of the opening 11. The opening 12 may have a rounded portion struck preferably on a radius of approximately the same length as that of the opening 11, although the radii of the two openings may be different. The plate 13 is shown as struck from the same center as the opening 11 and curves in the same manner as the peripheral portion of the opening 11. This results in the upper side of the opening 12 being concaved, so that the opening 12 as shown in the drawings and particularly in Figs. 2 and 3 is crescent-shaped with the horns of the crescent uppermost. Face plate 10 is provided with a peripheral flange 14 of circular outline to receive the bead 2 and at intervals corresponding to the perforations 4 are blocks 15 on what constitutes the inner face of the plate 10. Certain of the blocks 15 have threaded passages 16 therein for the reception of screws 17 extending through the bead 2 and also through washers and entering the blocks 15 to secure the face plate to the body 1 of the headlight. The blocks 15 have each a lip 18 thereon directed toward the central portion of the plate 10 and seated on these blocks is a glass pane 19 held against the inner face of the face plate by a packing ring 20 engaging the blocks and secured by the lips 18.

Within the casing 1 back of the face plate 10 is a reflector 21 which may be, as is customary in headlights, of parabolic shape. The reflector 21 has marginal portions 22 on opposite sides, and at what constitutes its top portion and also in the side portions 22 there are produced tongues 23 bent to extend through certain of the perforations 4 in the portions 5 and 6 of the flange 3 at the front of the casing 1. This serves to support the reflector 21 within the casing 1 against accidental displacement when the parts are all assembled. Of course other means may be used for the purpose.

At what constitutes the bottom of the reflector 21 is an extended section 24 bent toward the rear of the reflector for a purpose that will be referred to.

In each side portion 22 of the reflector 21 is an upright series of slots 25, any one of which in the two series may be entered by tongues 26 in terminal portions 27 of a curved plate 28 having a curvature on the upper edge corresponding to the curvature of the plate 13. The plate 28 has its lower edge straight along a line 28ª, being bent back to form the flange 29, and is installed behind the glass 19 and in front of the lower edge of the reflector 21. The plate 28 is so positioned with the lower portion in front of the upper portion of reflector 30, as to be immediately behind the plate 13 when the tongues 26 engage in the highest ones of the slots 25. From such position the plate 28 may be dropped step by step for a limited distance determined by the number of slots in the series 25. The bent margin of the plate 28 being in the form of an inturned flange 29 serves to stiffen the plate. The plate 28 serves as a light shield, and when dropped will change the crescent-shaped opening 12 to a semi-circular shaped opening.

Within the casing 1 below the reflector 21 is another reflector 30 having marginal tongues 31 engaging in those perforations 4 in the lower portion of the flange 3.

The reflector 30 is an incomplete parabola so as to fit snugly under the reflector 21 with its axis on about a level with the bottom of the plate 13 and of the plate 28 when the latter is in its lowermost position. The reflector 30 has peripheral tongues 31 engaging in certain of the perforations 4 to hold the reflector in place.

Associated with each reflector is an electric lamp socket 32 in which may be lodged a suitable electric lamp bulb 33. Conductors 34 are connected to the sockets 32 and are carried out from the casing 1 through the tube 9.

The section 24 of the reflector 21 is so related to the lamp 33 in the reflector 30 that light emitted by the lamp 33 will be diverted by the section 24 which is of a reflecting nature, in the direction which will cause it to strike upon the roadway close in front of the vehicle carrying the headlight, thus brilliantly illuminating such roadway without reaching the eyes of any person close to the vehicle but in front thereof.

By providing suitable switches either or both of the lamps 33 may be energized.

If it be assumed that the lamp 33 within the reflector 21 is energized, then a full circular beam of light will be projected from the headlight forwardly of the vehicle and at about the height of the headlight. Such beam of light may be an intense beam and illuminate the roadway far ahead of the vehicle and can be utilized for travel in otherwise unilluminated roadways.

There are other places where such illumination is not desirable and is frequently forbidden. In such localities the lower lamp is energized and the upper one cut out. Under these circumstances, the beam of light projected by the reflector 30 will be a crescent-shape having its horns uppermost or of semi-circular shape, the upper edge of the illuminated portion being then a horizontal line having its intense portion low, and low enough to comply with headlight regulations practically everywhere. The beam of light is prevented by the plate 13 and the lower portion of reflector 21 from rising to a greater height than the axis of the reflector 30, and as such height is customarily lower than the extreme height permitted, about 42 inches, there is no liability of distracting glares being produced to annoy persons approaching the headlight or toward whom the headlight is moving.

Should the conditions be such that it is desirable to lower the level of the projected beam of light issuing from the reflector 30, the plate 28 is lowered and the beam of light is correspondingly lowered and is then semi-circular in shape, the plate 13 and a part of the reflector 21 preventing any escape of light over the top of the lowered plate 28.

When the full benefit of the headlight is wanted, both lamps 33 are energized, thus producing a light of the greatest intensity of which the headlight is capable.

The various parts of the headlight are so arranged as to interlock and be readily separable on the removal of the screws 17 of which there need be only two, although this does not preclude the employment of more than two screws or of the employment of other fastening devices than screws.

It is not obligatory that the reflectors be of the particular shape and size indicated or that the reflectors together define a more or less oval formation, since these parts are susceptible of considerable variation. However, it is preferred that the reflectors be in superposed order with the higher reflector round and the lower reflector of crescent shape with the horns uppermost.

The straight lower edge of the upper reflector is important in providing a circular upper beam of light and a semi-circular lower beam of light in the event of the plates 13 and 28 being omitted.

It is unnecessary that both reflectors be contained in one casing so long as they are associated in substantially the manner described.

In Figs. 10 and 11 there is shown a plate 35 having a flat surface and at one end bent at an angle as shown at 36 and notched at 37 so as to fit between the reflector 21 and its flange 24, with the angle portion 36 behind the lamp 33 and with the notch 37 embracing the base of the lamp.

This increases the outward and downward reflection of the light.

What is claimed is:

1. A headlight having two closely associated superposed reflectors with clear glass fronts, the high reflector being round at the light emitting opening and the lower reflector having its light emitting opening defining less than a full circle, and opaque means located in front of and between the reflectors and extending downwardly into intercepting relation to the path of rising beams of light from the lower reflector and of a width to cover the adjoining parts of both reflectors, whereby the rising beams of light are cut off and the production of glare above the level of the opaque means is prevented.

2. A headlight provided with two closely associated superposed reflectors, the upper reflector defining a full circle and the lower reflector defining a crescent with the horns uppermost, a clear glass front for both reflectors, and opaque means of a width to cover adjoining parts of both reflectors and located at the top of the light emitting opening of the lower reflector at substantially the optical axis of the lower reflector, whereby rising beams of light from the lower reflector are cut off and the production of glare above the level of the opaque means is prevented.

3. A headlight provided with two closely associated superposed reflectors, with the emitting end of the upper reflector defining a full circle, and a connecting plate conforming to the junction line of the reflectors.

4. A headlight provided with two closely associated superposed reflectors, with the light-emitting opening of the upper reflector defining a full circle and the light-emitting opening of the lower reflector defining less than a full circle, and a cover plate for the associated reflectors having superposed openings therethrough, one of circular conformation and the other of crescent conformation with the horns toward the first-named opening, and said cover plate including a web spacing the openings one from the other and curved on an axis corresponding to the optical axis of the upper reflector, and a substantially straight reflector lodged in the lower reflector immediately beneath the upper reflector and behind the division web between the light openings of the two reflectors.

5. A headlight provided with two closely associated superposed reflectors, with the upper reflector defining a full circle at its light emitting end and the lower reflector defining a crescent with the horns uppermost, the upper reflector being of a different area from the lower reflector, and an adjustable light shield between the two reflectors, the adjustment of the shield being in an up and down direction.

6. A headlight provided with two closely associated superposed reflectors with a plate in front of the reflectors at the junction thereof, and a light shield associated with the plate and provided with a straight bottom portion, said light shield being adjustable up and down to increase and decrease the effective extent of the light shield.

7. A headlight provided with two closely associated superposed reflectors with a plate in front of the reflectors at the junction thereof, and a light shield associated with the plate and provided with a straight bottom portion.

8. A headlight provided with two closely associated superposed reflectors, the lower reflector having therein a forwardly and downwardly slanting light-diverting reflecting surface directly overlying and close to a lamp in the reflector to throw a beam of light downwardly in front of and relatively close to the lower reflector.

9. A headlight provided with two closely associated superposed reflectors having a light shield between their adjacent portions and adjustable up and down, with the optical axis of the upper reflector substantially central thereto and the optical axis of the lower reflector substantially in line with the lower edge of the light shield between the two reflectors when said light shield is in its lowered position, and the optical axes of the two reflectors being substantially parallel one with the other, whereby the light beams from the reflectors are similarly projected with the light beams from the lower reflector confined to the height of the lower edge of the light shield above the surface over which the headlight is located.

10. A headlight provided with two closely associated superposed reflectors with a separating web between their adjacent portions, the upper reflector having its optical axis substantially central to the reflector and the lower reflector having its optical axis substantially in line with the division web between the two reflectors, and said headlight having a light shield located adjacent to the division web and adjustable up and down to vary the effective height of the light shield.

11. A headlight provided with two closely associated superposed reflectors within a single casing, the upper reflector having the lower part of its marginal portion bent rearwardly to produce a lower straight horizontal edge.

12. A headlight provided with two closely associated superposed reflectors within a single casing, the upper reflector having the lower part of its marginal portion bent rearwardly to produce a lower straight edge, a web in front of the lower edge of the upper reflector, and a light shield between the web and said lower edge of the upper reflector.

13. A headlight provided with two closely associated superposed reflectors and a casing in front of the reflectors with two light openings through which light is projected from the reflectors, the openings being in superposed order and spaced apart at their adjacent edges, the upper opening defining a full circle and the lower opening defining a crescent with its horns uppermost, and a light shield located in the space between the adjacent edges of the superposed openings and adjustable to reduce the upper portion of the effective area of the lower opening.

14. A headlight provided with two closely associated superposed reflectors within a single casing, with two light openings through which the light is projected, one opening defining a full circle and an adjustable light shield, movable with relation to the other opening to shape its effective light emitting opening as a semi-circle.

15. A headlight provided with two closely associated superposed reflectors within a single casing and having two light openings at the front of the headlight, one opening defining a full circle and the other opening defining a crescent with the horns uppermost, and a light shield adjustable over the upper portion of the lower light opening and having a straight lower edge whereby the crescent-shaped opening may be made semi-circular.

In testimony that I claim the foregoing as my own I have hereto affixed my signature in the presence of two witnesses.

HERBERT W. BROWN.

Witnesses:
EARL S. DETTINGER,
J. C. FRENTZ.